Jan. 17, 1967  H. G. HEINRICH  3,298,640
PARACHUTE
Filed Aug. 19, 1964  2 Sheets-Sheet 1

HELMUT G. HEINRICH
INVENTOR.

BY *Albert Sperry.*

ATTORNEY

Jan. 17, 1967  H. G. HEINRICH  3,298,640
PARACHUTE
Filed Aug. 19, 1964  2 Sheets-Sheet 2

HELMUT G. HEINRICH
INVENTOR.

BY Albert Sperry
ATTORNEY

United States Patent Office 3,298,640
Patented Jan. 17, 1967

3,298,640
PARACHUTE
Helmut G. Heinrich, Minneapolis, Minn., assignor to Pioneer Parachute Co., Inc., Manchester, Conn., a corporation of Delaware
Filed Aug. 19, 1964, Ser. No. 390,561
10 Claims. (Cl. 244—145)

This invention relates to parachutes and particularly to parachutes which are formed entirely of, or are formed in part of, knitted, crocheted or other forms or types of interlacked or looped threads, yarns or strands of fiber, plastic, wire, or other material as distinguished from loom-woven cloth, fabrics, or conventional wire screens.

Parachutes are now being used for a great variety of purposes at super-sonic and sub-sonic speeds wherein they may be subjected to widely differing conditions of speed, air density, air resistance or pressures, temperatures and the like. Many attempts have been made to meet the problems thus presented in the construction and use of parachutes by forming the canopy of variously shaped, spaced or arranged panels, gores and surfaces. For this purpose, panels and surfaces having numerous seams, darts or inserts are frequently used. However, experience has demonstrated that the seams between panels, gores or other parts of parachute canopies formed of loom-woven cloth or fabric seldom possess more than about 70 to 80% of the strength of the fabric itself. As a result, the failures and damage which have occurred in prior art parachute canopies have generally been initiated in and extended from such seams or darts. Furthermore, in many prior parachutes, such as ring-slot chutes, ring-sail chutes, ribbon chutes and those parachutes wherein one or more gores, panels or parts thereof are omitted, the canopies present abrupt discontinuities which tend to subject certain areas of the canopy to severe or excessive strains and loading while other areas thereof may possess greater strength, weight and bulk than is required.

In accordance with the present invention, a novel type of parachute is provided which may be unitary in construction and have no seams or darts whatever therein. At the same time, the canopy may present areas varying greatly in porosity, strength and other properties without necessarily presenting abrupt lines of discontinuity. For this purpose, the parachute canopy is preferably formed of knitted, crocheted, or interlaced thread, yarns, cords, wire, or other strands of material as distinguished from conventional or loom-woven cloth or fabrics and may be produced on circular knitting machines or any other type of knitting, crocheting, lace-making or other machines or equipment.

The present invention further contemplates the use of such knitted or similar material in combination with loom-woven fabrics or cloth to produce parachute canopies wherein one or more gores, panels or parts thereof possess particular or varying porosity, strength, thermal or other characteristics and properties. Moreover, in some instances, if desired, the suspension lines, harness or other elements of the parachute assembly may be formed integral with the parachute canopy itself by extending strands of material of which the canopy is formed in a desired manner or to a desired location.

Accordingly, the principal objects of the present invention are to increase the strength and improve the design, characteristics and properties of parachutes and parachute canopies; to reduce the number of seams, darts and the like presented in a parachute canopy; to reduce or control the discontinuity in the properties of parachute canopies; and to provide parachute canopies which are formed in whole or in part of knitted, crocheted, looped, or interlaced threads, yarns, cords, wire, or other strands of material.

These and other objects and features of the present invention will appear from the following description thereof wherein reference is made to the figures of the accompanying drawings.

Figure 1:
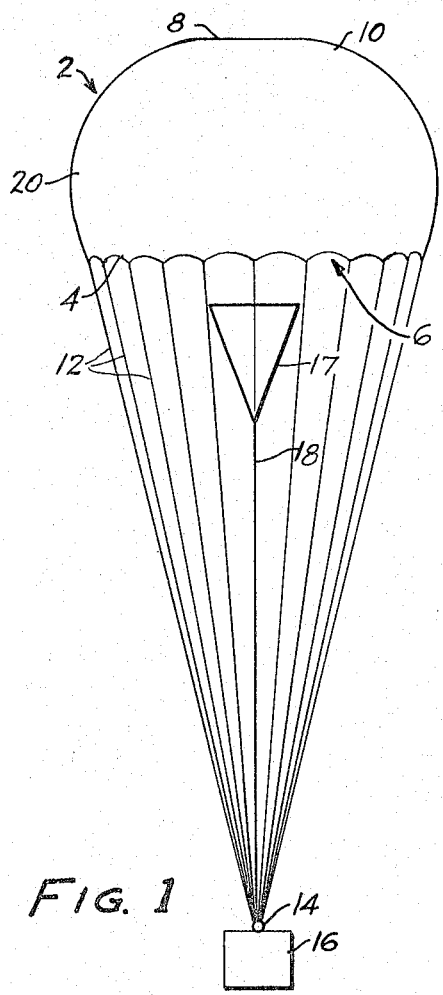
FIG. 1 is a diagrammatic side elevation of a typical form of parachute embodying the present invention.

The parachute assembly illustrated in FIG. 1 is of the type shown and described in U.S. Patent No. 3,114,523 and embodies a canopy 2 with a skirt or lower marginal edge 4 defining an air inlet opening or area 6 and a vent or air outlet opening 8 in the peak portion or top 10 of the canopy. Shroud lines 12 extend from the skirt 4 of the canopy to connecting means 14 for a load 16 and, if desired, the parachute may be provided with a centrally located inner cone 17 as shown in U.S. Patent No. 3,114,523 or an internal parachute as shown in U.S. Patent No. 3,110,459 connected to the load or connecting means 14 by an anchor line 18.

The parachute canopy may have any form, shape or contour desired and may be knitted or otherwise produced so as to provide the desired porosity, strength, heat or abrasion resistance or other properties throughout or in any selected area or portion of the canopy. Moreover, by forming the canopy on a circular knitting machine, by hand, by crocheting or in any other suitable way, the canopy can be given any desired shape or contour while at the same time being seamless. Thus for example, when producing parachutes designed for super-sonic or trans-sonic uses, the skirt or leading edge 4 of the parachute canopy will be subjected to high temperatures and pressures whereas the temperature and pressure of the mid-portion 20 of the canopy will be much less and the air pressure adjacent the vent or air outlet opening 8 will be quite high. Accordingly, the marginal portion or skirt of the canopy may be knitted relatively tight to increase its strength and reduce its porosity, and the strands of material employed adjacent the skirt may be formed of heat resistant material such as metal, glass fiber, asbestos, flexible wire, heat resistant plastic, or combinations thereof. The mid portion 20 of the canopy then may be knitted or otherwise formed to render it relatively porous while the peak 10 of the canopy may be closely knit to provide increased strength and limited porosity. Furthermore, the strength and type of the thread and the character of the knitting or looping of the strands of material used in various zones can be varied in accordance with the pressure loading, the radii, the free span, etc. of the parachute canopy.

In this way, it is possible to control or vary the porosity and elasticity of the fabric as well as the strength throughout the parachute canopy or in selected portions thereof so as to assure substantially uniform flow of air through the canopy and optimum strength throughout the surface thereof despite the relatively great differences in internal air pressure to which the canopy may be subjected. In the alternative, the porosity of the canopy can be varied to provide controlled or localized flow of air through the canopy by forming one portion or area of the canopy of a more open knit construction than another.

Figure 3:
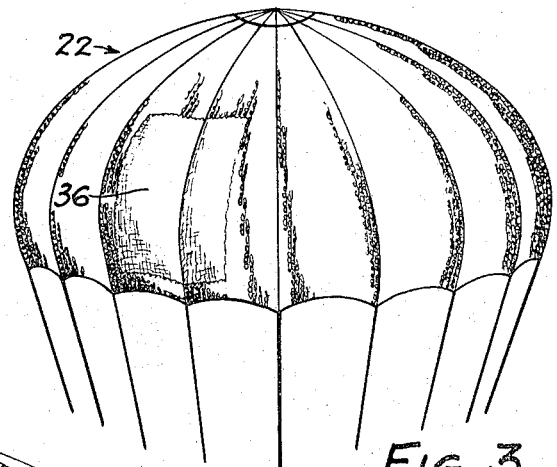
FIGS. 3 to 8 are diagrammatic illustrations of alternative forms of parachute canopy embodying the present invention.

A particular feature and advantage of the present invention resides in the fact that the parachute canopy can be given substantially any shape or contour desired by fabrication in a controlled manner on a circular knitting machine, or by crocheting or otherwise forming the same. At the same time, the canopy may consist of a single unitary and integral expanse of fabric wherein all seams, darts, or lines of juncture which might tend to present lines or zones of weakness are eliminated. Thus, as shown in FIG. 3, the parachute canopy 22 may have an upper portion or main body 24 which is of conventional rounded form and be provided with a lower downwardly and inwardly extending guide surface portion 26 for increasing the stability and improving the opening characteristics of the parachute canopy. Further, if desired, the peak of the canopy may be extended upwardly a short distance as indicated at 28 to afford a chimney effect and further serve to stabilize the canopy during the descent. The upper or mid portion 24 of the canopy may be more porous than the skirt and peak portions of the canopy, if desired. In addition, a marginal binding 30 may be applied to the skirt or peak or both portions of the parachute canopy.

In a typical construction designed for use at super-sonic or other very high speeds the canopy may comprise a seamless expanse of looped, knit, or crocheted flexible wire and the strength, porosity, and elasticity of the canopy may be varied in different portions thereof by differences in the form and arrangement of the loops of wire in the fabric. The wire itself may be formed of multiple strands or coils of wire. Moreover, if a marginal binding is provided as shown at 30 in FIG. 2 it may be formed of ablation material or other heat dissipating means or have the same applied thereto in other ways.

Figure 2:
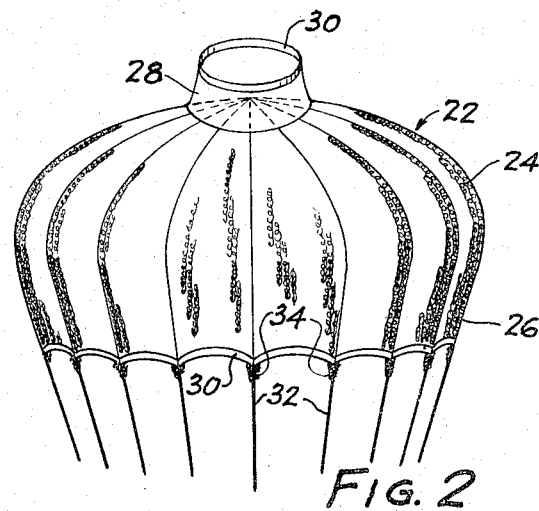
FIG. 2 is a perspective of a typical parachute canopy embodying the present invention.

Shroud lines 32 of the parachute extend downward from the canopy to a load and while they may be formed separately from the canopy and extend across the peak thereof, they may in the alternative be formed by gathering together strands of the material used in producing the canopy as shown at 34 in FIG. 2. The shroud lines then may be extended down to the load or load connecting means while being integral with the canopy itself.

The seamless but contoured form of a parachute canopy of this type renders it possible to attain the requisite strength where necessary while employing relatively light thread, or strands of material in knitting the canopy. The bulk and weight of the canopy and its cost are thereby reduced without sacrifice to the safety or impairing its functional characteristics. Furthermore, the composition and characteristics of the threads or strands employed in knitting or otherwise forming the various portions of the canopy can be selected to assure the necessary or desired properties in the various portions of the canopy.

Constructions embodying the present invention further may be constructed so as to have a canopy which is formed of relatively wide mesh or open construction of relatively great strength and be provided with an inner layer of material of more limited porosity as shown at 36 in FIG. 3. With this construction, a cover or netting of wire or the like may be used whereas the layer 36 may be formed of relatively fragile or weak knitted or woven strands or sheet material which would be unsuitable for use by itself in forming a parachute canopy designed to be subjected to the conditions of use. Thus, for example, the inner layer 36 of the parachute canopy can if desired be formed of felted or unwoven fibers made of mineral wool, glass or high temperature resistant material having but little strength or resistance to rupture. Nevertheless, the support afforded by the outer knit canopy 22 will be sufficient to prevent destruction of the lining and hold it in place during use.

Figure 4:
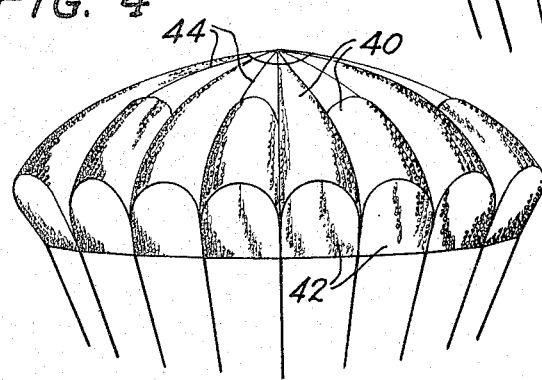

Contour knitting or crocheting of the parachute canopy may be employed when producing parachute canopies of the type shown and described in U.S. Patents Nos. 2,683,575 and 2,737,358 as exemplified by FIG. 4. As there shown, the gores 40 and the end panels 42 embodied in the canopy can be knit or otherwise formed as a single unitary construction. The gores and end panels may in the alternative be knit as separate elements and sewn or otherwise secured together along the line 44. Thus, a canopy having numerous lobes, extensions, or variously shaped portions can be produced by controlled knitting, crocheting or other operations while being in the form of a unitary, integral, seamless expanse of material.

Figure 5:
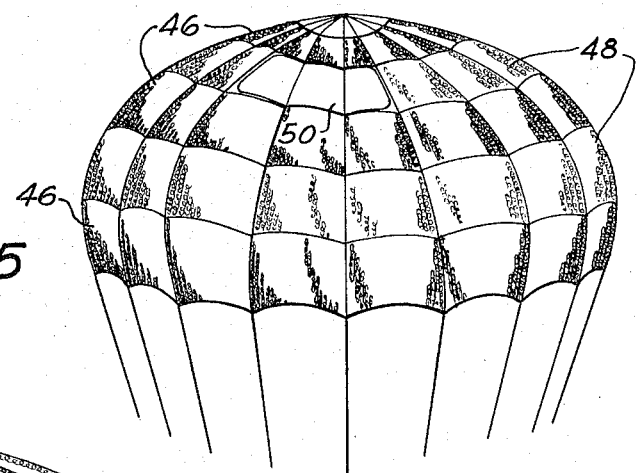

In the alternative, the parachute canopy may be constructed so as to have the essential characteristics of ring-slot or ring-sail parachutes while being of a seamless unitary construction as shown in FIG. 5. As there illustrated, the annular zones 46 of the parachute canopy are relatively closely or tightly knit to provide areas of limited porosity whereas the adjacent or intermediate annular zones 48 of the canopy are loosely knit or otherwise formed to provide zones of high porosity through which air may flow readily from the interior to the exterior of the canopy. If desired, opening of the desired size, shape and location can be provided in the knitted and unitary canopy as shown at 50.

Figure 6:
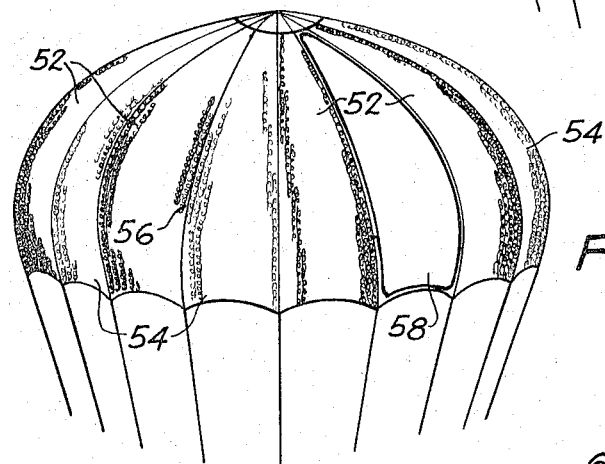

As shown in FIG. 6, the parachute canopy can be similarly knit or formed to present radially extending zones or gores 52 of limited porosity while other radial gores or zones 54 of the canopy may be of an open structure or loose knit of high porosity. In this way, parachutes having the characteristics of "blank gore" parachute canopies can be produced. The construction of FIG. 6, as well as that of FIG. 5, can be so formed as to afford a somewhat gradual transition from the zones of high porosity to those of relatively low porosity as indicated by the area 56 whereby abrupt discontinuity in the properties of adjacent portions of the canopy can be avoided. On the other hand, the canopy can be provided with complete openings or blank gores as shown at 58, if desired.

When the parachute canopy presents areas, gores or zones of high porosity the flow of air therethrough may be substantially as free as when a blank gore or opening is provided. However, a limited number of relatively widely spaced threads or strands in such areas will serve to prevent unrestricted movement or separation of the material at opposite sides of the porous zones whereby the shape and area of the porous zone is controlled and the operation of the parachute is rendered more stable and predictable. Moreover, the application of excessive strains on the relatively non-porous material adjacent the venting porous zones is reduced or prevented. Nevertheless, as indicated above, openings may be formed in the canopy as an incident to the knitting operation or they may be formed in a finished canopy by removal of portions thereof. The edges of such openings may be bound by crocheting or otherwise.

Figure 7:
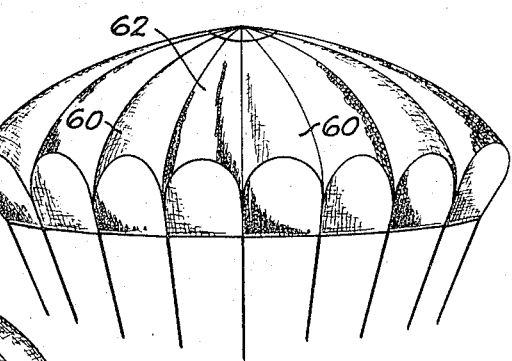

While parachute canopies embodying the present invention are preferably seamless and formed as a unitary integral construction, the present invention may also be employed in parachutes having panels, gores or portions thereof formed of loom-woven cloth or fabric. Thus, as illustrated in FIG. 7, a parachute canopy having the essential characteristics of a "blank gore" parachute may be produced. For this purpose, the radial panels 60 of the canopy may be formed of conventional material, such as rip-stop nylon, whereas selected and spaced panels 62 may be formed of relatively porous, knit or crocheted material.

Figure 8:
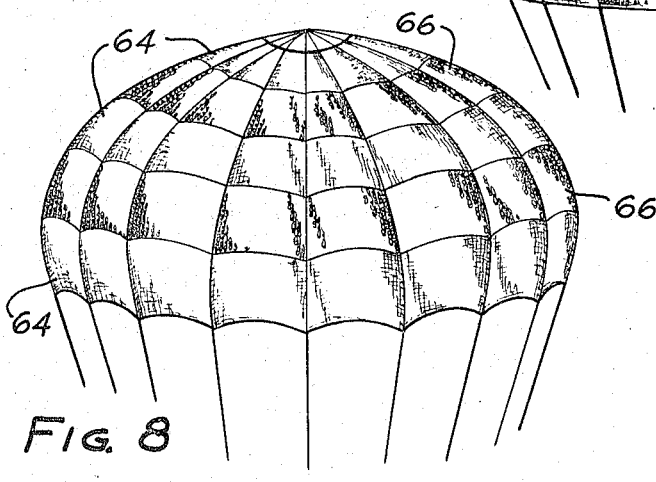

In a similar way, parachutes having the characteristics of ring-slot, ring-sail, or ribbon chutes can be produced as shown in FIG. 8 by providing the canopy with annular panels 64 of conventional or other loom-woven cloth or fabric or panels formed of plastic or non-porous material, with intermediate annular zones or panels 66 of knitted or crocheted material of the desired porosity.

If desired, other portions or zones of parachute canopies may also be formed of knitted and relatively porous material while others are formed of conventional fabric, cloth or other material which has limited porosity or is non-porous. Thus, for example, in constructing parachutes of the type shown in FIG. 4, and U.S. Patents Nos. 2,683,575 and 2,737,358, the radially extending gores 40 of the canopy may be formed of rip-stop nylon or the like and may be curved in cross section both radially and circumferentially while being provided with end panels 42 secured to the peripheral edges of the gores and formed of knitted or crocheted material On the other hand, such gores may be formed entirely of knitted material if desired. In accordance with the present invention it is particularly advantageous to produce canopies of this type from a plurality of individual gores and to secure them together along their radical edges. In this way, it is possible to provide the requisite strength to the gores to withstand the aerodynamic forces and material stresses throughout the bowed surfaces thereof while forming the gores of unitary contoured knitted material and eliminate the multiple seams which are required in order to produce such gores of flat sheets of conventionally woven fabrics.

In each of the embodiments of the invention shown and described and in other forms thereof, the knitted, crocheted or looped strands of material may be so formed, arranged or proportioned and interlocked as to form a "stretch-fabric" or a material having the desired elastic properties to relieve strains applied thereto and to vary the porosity thereof during use. Such elasticity of the canopy or parts thereof will also serve to aid in absorbing both mechanical and thermodynamic energy developed during the use of the parachute in retarding the fall or movement of the load to which it is connected. Moreover, such elasticity may be developed within selected or limited areas of the canopy as represented by the gores 40 and panels 42 of the canopy of FIG. 4 or the radially or annularly extending panels or zones of the parachute canopies of FIGS. 5 to 8.

Parachutes embodying the present invention have many applications for special and unusual uses, as exemplified by re-entry parachutes designed to retard loads travelling at extremely high speeds and in a rarefied atmosphere while thereafter being subjected to the conditions presented at lower mach numbers and a denser atmosphere, and ultimately descending at quite limited and sub-sonic speeds for final landing. However, the invention may also be employed in producing conventional or other types of life saving or load dropping parachutes, drogue chutes, pilot chutes, steerable parachutes, stabilizing chutes for rockets, torpedoes and in the recovery of missiles or the like. The fabrication of extremely large parachutes is also facilitated in that they may be knitted in a continuous operation while being given the desired contour and porosity at any point or portion thereof.

It will thus be apparent that parachutes embodying the present invention may have any desired form, shape or design and may be employed under substantially any conditions wherein retardation in the rate of fall or speed of travel of a body is desired. In view thereof, it should be understood that the particular embodiments of the invention shown in the drawings and described above are intended to be illustrative only and are not intended to limit the scope of the invention.

I claim:

1. A parachute having a seamless contoured canopy composed of knitted material wherein the strands of which the material is formed are looped in directions extending both radially and circumferentially of the canopy.

2. A parachute canopy as defined in claim 1 wherein one portion of the canopy has greater porosity than another.

3. A contoured parachute canopy embodying a plurality of adjacent zones which differ in porosity, at least one of said zones which is of greater porosity than an adjacent zone being formed of looped and interlaced strands of material said strands being looped in directions extending radially and circumferentially of the parachute canopy.

4. A parachute canopy embodying a skirt portion, a peak portion and a body portion located between the skirt portion and peak portions of the canopy and connected thereto, said body portion being more porous than the skirt portion and peak portion of the canopy, at least one of said portions being formed of looped and interlaced strands of material.

5. A parachute canopy embodying a plurality of radially extending gores, at least one of said gores being formed of seamless knitted material wherein the strands of which the knitted material is formed are looped in directions extending both radially and circumferentially of the canopy and the gore is arched in cross-section in both radial and circumferential directions.

6. A parachute canopy embodying a plurality of seamless radially extending gores each of which is arched in both radial and circumferential directions, end panels connected to said gores adjacent the peripheral edges thereof and extending downwardly and inwardly therefrom, at least some of said gores being formed of looped and interlaced strands of material wherein said strands are looped in directions extending both radially and circumferentially of the canopy.

7. A seamless parachute canopy presenting an upper rounded surface and a peripheral portion which extends downwardly and inwardly from the upper surface of the canopy said canopy comprising knitted material varied within the area thereof to impart such contour to the canopy when inflated the strands of which said knitted material is formed being looped in directions extending both radially and circumferentially of the canopy.

8. A seamless contoured parachute canopy formed of looped strands of flexible wire with said strands being looped in directions extending both radially and circumferentially of the canopy.

9. A seamless parachute canopy embodying looped strands of flexible wire, said canopy having portions thereof which differ in strength, porosity and elasticity.

10. A parachute canopy embodying a plurality of zones formed of looped strands of material, the strands of material in one of said zones differing from the strands of material in another of said zones.

References Cited by the Examiner

UNITED STATES PATENTS

| 2,164,704 | 7/1939 | Ferrari | 244—145 |
| 2,358,582 | 9/1944 | Little | 244—145 |
| 2,576,255 | 11/1951 | Hudspeth et al. | 66—202 X |
| 2,737,358 | 3/1956 | Heinrich | 255—145 |
| 3,195,842 | 7/1965 | Wilson | 244—145 |
| 3,218,007 | 11/1965 | Gross | 244—145 |

OTHER REFERENCES

Callaway Textile Dictionary, 1st Ed. Printed by the Callaway Mills, La Grange, Georgia; 1947.

MILTON BUCHLER, *Primary Examiner.*

ALFRED E. CORRIGAN, *Examiner.*